Dec. 31, 1940.  C. GIAMBRA  2,227,252
CONVERTIBLE TYPE BICYCLE
Filed June 22, 1939
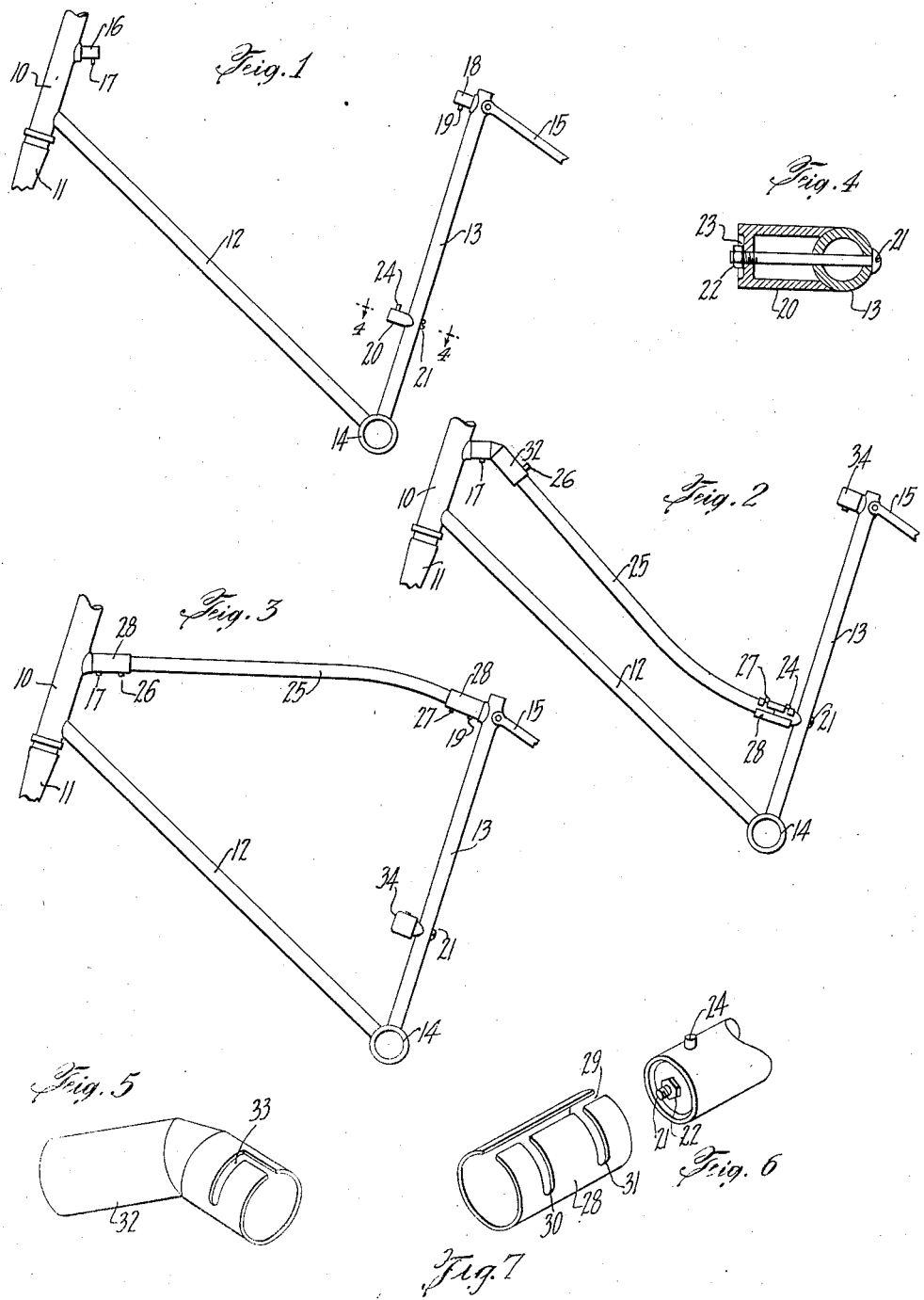
INVENTOR.
Cataldo Giambra
M P Parish
ATTORNEY.

Patented Dec. 31, 1940

2,227,252

UNITED STATES PATENT OFFICE 2,227,252

CONVERTIBLE TYPE BICYCLE

Cataldo Giambra, New York, N. Y.

Application June 22, 1939, Serial No. 280,498

4 Claims. (Cl. 280—7.11)

This invention relates to bicycles, and it is the object of the invention to provide a bicycle which may be converted from a man's bicycle to a woman's bicycle or vice versa by making a few simple mechanical adjustments.

A feature of the invention is the provision of a bicycle frame in which the top cross-piece of the central triangular section is removable and transferable to connect the top of the front post of the frame with the vertical leg of the triangular section to form two substantially parallel tubes such as are usually found in a woman's bicycle to avoid interference with a woman's skirt. This transferable tube or section of the frame may be curved upwardly and in the man's bicycle fixed in position in the frame with the arc of the curve turned upwardly and in the woman's bicycle fixed with the curve extending downwardly.

Further features of the invention include a stud secured near the top of the vertical member of the frame and projecting forwardly and another stud secured on the lower portion of the vertical section and also projecting forwardly. These projections carry side headed screws in which slotted connecting sleeves may engage. The opposite ends of the transferable tube section carry laterally projecting headed screws near each end so that the end of the tube is positioned in a sleeve and locked therein by means of a pin-and-slot connection. A similar slotted sleeve is used at the front in the man's style bicycle and a bent slotted sleeve in the woman's style, for joining the front end of the transferable piece with a rearwardly projecting stud on the front post of the bicycle which has a laterally projecting headed screw. A cap may be provided to cover the stud that is not in use to prevent the laterally projecting screw head from injuring the rider or tearing the clothing. This cap is transferable to cover the exposed stud when the bicycle is converted from one form to another.

Reference is made to the drawing in which:

Fig. 1 is a side elevation of the improved bicycle frame with the transferable piece removed.

Fig. 2 is a similar view with the transferable piece positioned below to provide a woman's bicycle.

Fig. 3 is a similar view with the top piece positioned above to provide a man's bicycle.

Fig. 4 is a cross-section on the line 4—4 of Fig. 1.

Fig. 5 is a view of a front connection to be used in the woman's form of bicycle.

Fig. 6 is a perspective view of a supporting stud.

Fig. 7 is a perspective view of a slotted connecting sleeve.

The frame portion only of a tubular bicycle frame is illustrated in the drawing, having a front post 10, which rotatably supports a front wheel fork 11 (broken away), a lower main frame member 12, a substantially vertical frame member 13, which usually supports the bicycle seat thereon, a pedal crank casing 14, and a rear wheel frame 15 (broken away).

In place of the usual welded joint at the front of the top cross-piece of the frame, a rearwardly projecting stud 16 is mounted on the post 10 having a lateral headed screw 17 secured thereto. A forwardly projecting stud 18 is mounted near the top of the vertical frame member 13 opposite to the rear wheel frame 15. This stud 18 is provided with a lateral headed screw 19. Another forwardly projecting stud 20 is mounted on the vertical frame member 13 at about one-third the height of the frame member. This stud 20 is secured to the vertical frame member 13 by means of a bolt 21 and a nut 22 on the forward end of the bolt which engages the counter-sunk flat end piece 23 in the stud 20. The stud 20 has a lateral headed screw 24.

A transferable tubular piece 25 having a curve at the rear is substituted for the usual straight cross-piece and mounts a lateral headed screw 26 at the front end and also mounts at the rear end another headed screw 27. Two similar slotted sleeve connectors 28 are formed to exactly fit over the ends of the cross-piece 25 and each has a lengthwise slot 29 which connects with two parallel transverse slots 30, 31 equidistant from the ends, so the sleeve 28 is reversible. An obtuse angled connecting sleeve 32 has in one of the ends, a bayonet slot 33, and the other end forms a long hollow connection for receiving the tubular end of the piece 25. A stud cap 34 is placed either on the stud 18 or on the stud 20 according to the position of the cross-piece 25 to protect the rider.

As shown in Fig. 2 the tubular piece 25 is attached at the front end by the angled connector 32 whose slot engages the stud 16 and the screw 17 is tightened to hold it rigidly. A connecting sleeve 28 is placed over the stud 20 which engages one of the slots 30 or 31 and the screw 24 is tightened to hold it securely and the inner end of the crosspiece 25 is inserted in the opposite end of the sleeve 28 and the screw 27 is placed in the other slot and is tightened to hold the sleeve securely. In this form the frame is adapted for a woman rider.

Referring to Fig. 3 the cross-piece 25 is secured by a screw 26 to a sleeve 28 the opposite end of which is secured to the stud 16 by the screw 17 and the rear end of the cross-piece 25 is secured in another similar connecting sleeve 28 by means of the screw 27 and the opposite end of the sleeve 28 is secured to the stud 18 by the headed screw 19.

It is apparent that I have provided a convertible bicycle frame which can be quickly changed from a woman's style bicycle to a man's style bicycle, or vice versa. In order to prevent the screws 24 and 19 from interfering with the body or the clothing of a rider, I provide a protective cap 34 which is placed either on the stud 20 or on the stud 18 according to the position of the cross-piece 25.

Having shown and described one form of my invention and realizing that in view of my disclosure many changes, substitutions, or omissions of parts will readily occur to those skilled in the art, I do not limit myself to the exact form and structure disclosed. For example the screw members 17, 19, 24, etc. need not have screw heads and members 28 and 32 may have an outer tubular covering to enclose the slotted portions so that the extending screw tip of members 17, 22, etc. will not protrude.

I claim:

1. In a bicycle having a substantially triangular central frame including a pedal crank casing and a front post, said post having only two rearwardly extending connectors, a substantially vertical member mounted on the pedal crank casing, a forwardly and upwardly extending member also mounted on the pedal crank casing and permanently connected at the front end with the post forming one connector, a cross-piece formed of hollow tubing, a headed screw mounted laterally near the end at the front of the cross-piece and a similar headed screw mounted laterally near the rear end of the cross-piece, a hollow sleeve having a slot at one end and a slot at the other end, said sleeve ends being non-aligned, a single stud mounted on the upper end of the post and having a laterally projecting headed screw forming the other connector, the sleeve detachably connecting the post stud and the front end of the cross-piece, a second sleeve having a slot adapted to receive the headed screw at the rear end of the cross-piece and having at the opposite end another slot, a forwardly projecting stud mounted near the top of the vertical member, a laterally projecting headed screw thereon, said screw being adapted to engage the slots in said sleeve, and a second forwardly projecting stud mounted above the pedal crank casing on the vertical member having a laterally projecting headed screw, said second stud and said screw being symmetrical with the stud and screw mounted on the upper portion of the vertical member, whereby the rear end of said cross-piece can be selectively mounted on either the upper stud or on the lower stud of the vertical member.

2. In a bicycle having a substantially triangular central frame including a pedal crank casing and a front post, said post having only two rearwardly extending connectors, a substantially vertical member mounted on the pedal crank casing, a forwardly and upwardly extending member also mounted on the pedal crank casing and permanently connected at the front end with the post forming one connector, a cross-piece formed of hollow tubing, a pin mounted laterally near the rear end of the cross-piece, a hollow sleeve having a slot at one end and a tube at the other end, said sleeve ends being non-aligned, a single stud mounted on the upper end of the post and having a laterally projecting pin forming the other connector, the sleeve detachably connecting the post stud and the front end of the cross-piece, a second sleeve having a slot adapted to receive the pin at the rear end of the cross-piece and having at the opposite end another slot, a forwardly projecting stud mounted near the top of the vertical member, a laterally projecting pin thereon, said pin being adapted to engage a slot in said second sleeve, and a second forwardly projecting stud mounted above the pedal crank casing on the vertical member having a laterally projecting pin, said second stud and said pin being symmetrical with the stud and pin mounted on the upper portion of the vertical member, whereby the rear end of said cross-piece can be selectively mounted on either the upper stud or on the lower stud of the vertical member.

3. In a bicycle having a substantially triangular central frame including a pedal crank casing and a front post, said post having only two rearwardly extending connectors, a substantially vertical member mounted on the pedal crank casing, a forwardly and upwardly extending member also mounted on the pedal crank casing and permanently connected at the front end with the post forming one connector, a cross-piece formed of hollow tubing, a headed screw mounted laterally near the rear end of the cross-piece, a hollow sleeve having a slot at one end and a tube at the other end, said sleeve ends being non-aligned, a single stud mounted on the upper end of the post and having a laterally projecting headed screw forming the other connector, the angular sleeve detachably connecting the post-stud and the front end of the cross-piece, a second sleeve having a slot adapted to receive the headed screw at the rear end of the cross-piece and having at the opposite end another slot, a forwardly projecting stud mounted near the top of the vertical member, a laterally projecting headed screw thereon, said screw being adapted to engage a slot in said sleeve, and a second forwardly projecting stud mounted above the pedal crank casing on the vertical member having a laterally projecting headed screw, said second stud and said screw being symmetrical with the stud and screw mounted on the upper portion of the vertical member, whereby the rear end of said cross-piece can be selectively mounted on either the upper stud or on the lower stud of the vertical member.

4. In a bicycle having a substantially triangular central frame including a pedal crank casing and a front post, said post having only two rearwardly extending connectors, a substantially vertical member mounted on the pedal crank casing, a forwardly and upwardly extending member also mounted on the pedal crank casing and permanently connected at the front end with the post forming one connector, a cross-piece formed of hollow tubing, a pin mounted laterally near each end of the cross-piece, a hollow sleeve having a slot at each end thereof, said sleeve ends being non-aligned, a single stud mounted on the upper end of the post and having a laterally projecting pin forming the other connector, the angular sleeve detachably connecting the post stud and the front end of the cross-piece, two symmetrical forwardly projecting studs mounted one above the other on the vertical member, the lower stud being just above the pedal crank casing and each having a laterally projecting pin thereon, a second sleeve having a slot at each end thereof to receive the rear-end pin of the cross piece in one slot and the last named stud pin in the other slot, whereby said front angular sleeve and said second sleeve removably connect the cross piece to the vertical-member-lower-stud just above the pedal crank casing and to the post-stud at the top of the post.

CATALDO GIAMBRA.